US009878349B2

(12) United States Patent
Crest et al.

(10) Patent No.: US 9,878,349 B2
(45) Date of Patent: *Jan. 30, 2018

(54) POSTAL SORTING MACHINE WITH A FEED INLET HAVING A ROBOTIZED ARM AND A SLOPING FLAT CONVEYOR

(71) Applicant: Solystic, Bagneux (FR)

(72) Inventors: Karine Crest, Etoile sur Rhone (FR); Pierre Campagnolle, Allex (FR); Jacques Petit, Bourg les Valence (FR)

(73) Assignee: SOLYSTIC, Bagneux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,866

(22) PCT Filed: Dec. 16, 2015

(86) PCT No.: PCT/FR2015/053550
§ 371 (c)(1),
(2) Date: Feb. 1, 2017

(87) PCT Pub. No.: WO2016/102822
PCT Pub. Date: Jun. 30, 2016

(65) Prior Publication Data
US 2017/0165717 A1    Jun. 15, 2017

(30) Foreign Application Priority Data
Dec. 24, 2014 (FR) ..................... 14 63310

(51) Int. Cl.
*B07C 1/04* (2006.01)
*B07C 1/06* (2006.01)
(Continued)

(52) U.S. Cl.
CPC .................. *B07C 1/04* (2013.01); *B07C 1/06* (2013.01); *B25J 9/1697* (2013.01);
(Continued)

(58) Field of Classification Search
CPC .. B07C 1/04; B07C 1/06; B25J 9/1697; B25J 15/0616; B65G 47/14; B65G 47/1478;
(Continued)

(56) References Cited

U.S. PATENT DOCUMENTS 4,284,186 A * 8/1981 Brouwer ................ B65G 13/04
198/415
4,692,876 A * 9/1987 Tenma ................ B65G 1/1371
414/791.6
(Continued)

FOREIGN PATENT DOCUMENTS

DE    102007038834    2/2009

OTHER PUBLICATIONS

French Search Report dated Oct. 15, 2015, for Application No. 1463310.

*Primary Examiner* — Joseph C Rodriguez
(74) *Attorney, Agent, or Firm* — Patterson & Sheridan, L.L.P.

(57) ABSTRACT

The postal sorting machine comprises a sorting conveyor suitable for transporting postal articles in series past sorting outlets and a postal article feed unit having a magazine for loosely storing postal articles to be sorted and a separator that has a robotized arm and a vision sensor and that is suitable for picking up the postal articles to be sorted one-by-one from the magazine and for putting them on the sorting conveyor while placing them in series at constant pitch. The sorting conveyor has a flat conveyor that slopes sideways to form a jogging edge against which the postal articles are jogged by gravity.

6 Claims, 4 Drawing Sheets

(51) Int. Cl.
   *B65G 47/14* (2006.01)
   *B65G 47/91* (2006.01)
   *B65G 47/96* (2006.01)
   *B25J 9/16* (2006.01)
   *B25J 15/06* (2006.01)

(52) U.S. Cl.
   CPC ...... *B25J 15/0616* (2013.01); *B65G 47/1485* (2013.01); *B65G 47/917* (2013.01); *B65G 47/967* (2013.01); *B65G 2201/0285* (2013.01); *B65G 2203/044* (2013.01); *G05B 2219/39417* (2013.01); *G05B 2219/40607* (2013.01)

(58) Field of Classification Search
   CPC  B65G 47/1485; B65G 47/917; B65G 47/967; B65G 2203/0225; B65G 2203/0233; B65G 2203/041; G05B 2219/39417; G05B 2219/40607
   See application file for complete search history.

(56) References Cited

U.S. PATENT DOCUMENTS

| | | | |
|---|---|---|---|
| 5,065,237 A | 11/1991 | Tsikos et al. | |
| 5,101,958 A * | 4/1992 | LeMay | B65G 47/71 198/436 |
| 5,501,571 A * | 3/1996 | Van Durrett | B65G 61/00 414/21 |
| 6,412,621 B1 | 7/2002 | De Vree | B65G 37/02 198/347.4 |
| 6,471,044 B1 * | 10/2002 | Isaacs | B65G 43/08 198/347.4 |
| 6,484,886 B1 * | 11/2002 | Isaacs | B65G 43/08 198/368 |
| 6,699,007 B2 * | 3/2004 | Huang | B65G 47/90 414/21 |
| 6,755,606 B2 * | 6/2004 | Luebben | B65G 47/841 198/419.3 |
| 7,252,186 B2 * | 8/2007 | Paquin | B65G 15/06 198/347.4 |
| 8,644,984 B2 * | 2/2014 | Nagatsuka | B25J 9/1671 414/426 |
| 9,156,162 B2 * | 10/2015 | Suzuki | B25J 9/16 |
| 9,315,341 B2 * | 4/2016 | Leist | B65G 47/681 |
| 9,676,003 B2 * | 6/2017 | Kara | B07C 1/00 |
| 2013/0006423 A1 * | 1/2013 | Ito | B25J 9/1612 700/259 |
| 2013/0151007 A1 * | 6/2013 | Valpola | B25J 9/1694 700/245 |
| 2014/0079524 A1 * | 3/2014 | Shimono | B25J 9/1669 414/796.9 |
| 2015/0048010 A1 * | 2/2015 | Joplin | B21B 41/00 209/524 |
| 2016/0199884 A1 * | 7/2016 | Lykkegaard | B07C 5/02 700/223 |
| 2016/0228921 A1 * | 8/2016 | Doublet | B07C 5/3416 |
| 2016/0256897 A1 * | 9/2016 | Kara | B07C 1/00 |
| 2016/0263622 A1 * | 9/2016 | El Bernoussi | B65G 47/1478 |
| 2017/0225330 A1 * | 8/2017 | Wagner | B25J 9/1664 |

\* cited by examiner

POSTAL SORTING MACHINE WITH A FEED INLET HAVING A ROBOTIZED ARM AND A SLOPING FLAT CONVEYOR

TECHNICAL FIELD

The invention relates to the field of postal sorting.

The invention relates more particularly to a postal sorting machine comprising a sorting conveyor suitable for transporting postal articles in series past sorting outlets and a postal article feed unit having a magazine for storing postal articles to be sorted and a separator that is suitable for injecting the postal articles to be sorted one-by-one from the magazine onto the sorting conveyor while placing them in series at constant pitch.

PRIOR ART

Postal sorting machines are known that have bin carrousels for machine sorting of mixed mail comprising flat mailpieces of small format, and flat mailpieces of large format.

Such machine-sortable mailpieces may, for example, have lengths lying in the range 140 millimeters (mm) to 400 mm, widths lying in the range 90 mm to 300 mm, and thicknesses lying in range 0.5 mm to 32 mm, with their weights lying in the range 10 grams (g) to 2 kilograms (kg).

Such machine-sortable flat mailpieces may have (open or closed) paper envelopes, or have wrappers made of plastics material, or indeed be in banded bundles.

The range of mail also includes small parcels or packets having very heterogeneous dimensions, weights, and packaging with values that can lie outside the ranges indicated above.

Currently, such heterogeneous postal articles are not separated automatically. Such small parcels are currently separated semi-manually, and separately from homogeneous flat mailpieces, which increases postal sorting costs.

SUMMARY OF THE INVENTION

An object of the invention is to propose a postal sorting machine that is capable of automatically sorting heterogeneous postal articles of the small parcel or packet type that are generally in the shape of rectangular blocks.

Another object of the invention is to propose such a sorting machine that enables both homogeneous flat mailpieces and also heterogeneous postal articles of the small parcel or packet type to be sorted at the same time into the sorting outlets.

Another object of the invention is to propose such a postal sorting machine in which the footprints of the feed branches for feeding the homogeneous flat mailpieces and the heterogeneous postal articles of the small parcel or packet type remain small.

The basic idea of the invention is to unload the heterogeneous postal articles of the small parcel or packet type arriving at the sorting center loosely into a feed magazine of the sorting machine, and to use a robotized arm as a separator, the arm coming to pick up the heterogeneous postal articles one-by-one from the magazine via a pneumatic pickup.

The robotized arm is assisted by a vision system that observes the pile of heterogeneous articles stored loosely in the magazine to detect the postal article to be separated from the pile of postal articles and to identify a non-covered face of that postal article so as to enable the pickup of the robotized arm to take hold of the postal article in question via said pickup face.

More particularly, the invention provides a postal sorting machine comprising a sorting conveyor suitable for transporting postal articles in series past sorting outlets and a postal article feed unit having a magazine for storing postal articles to be sorted and a separator that is suitable for injecting the postal articles to be sorted one-by-one from the magazine onto the sorting conveyor while placing them in series at constant pitch, said postal sorting machine being characterized in that the separator has a robotized arm provided with a pneumatic pickup that is steerable in three-dimensional space, a vision sensor suitable for observing a pile of postal articles stored loosely in the magazine to produce image data including a certain postal article to be separated from the pile of loose postal articles, and a monitoring and control unit that, on the basis of the image data produced by the vision sensor, is suitable for identifying a non-covered pickup face of the certain postal article so that said postal article can be gripped by the pickup, the monitoring and control unit also being arranged to control the robotized arm in such a manner as to come and pick up the certain postal article via its pickup face and inject it onto the sorting conveyor, in that a flat conveying segment is organized to slope sideways, with a lower side edge and an upper side edge that is higher than the lower side edge, which is designed as a jogging edge, and the robotized arm is designed to put each postal article, separated from the pile of loose postal articles, individually onto the sideways-sloping flat conveying segment in such a manner that said article comes, by gravity, to be jogged against the lower edge of the conveyor.

In this postal sorting machine, the sorting conveyor may have bins, each of which is adapted to transport at least one postal article of the small parcel or packet type and to circulate along a closed-loop path above sorting outlet receptacles, e.g. removable trays.

The magazine in which the small parcels or packets are stored loosely may constitute the inlet of a specific automatic feed branch of the machine. Another automatic feed branch may be provided for receiving homogeneous flat mailpieces placed in a stack and on edge. Said specific branch may have an injection point at which the heterogeneous postal articles are injected into the bins of the carrousel and that is separate from the injection point at which the homogeneous flat mailpieces are injected.

With this arrangement, the homogeneous flat mailpieces and the heterogeneous postal articles of the small parcel or packet type can be sorted into the same sorting outlet receptacles of the machine while being put flat in said sorting outlet receptacles.

The postal sorting machine of the invention may also have the following features:

- the monitoring and control unit may also be arranged to detect that the image data produced by the vision sensor is insufficient to identify a non-covered pickup face of the certain postal article, and to respond to such detection by causing the magazine to shake by moving it forwards and backwards to change the three-dimensional configuration of the top of the pile of loose postal articles;
- the feed magazine may have a platform for storing the pile of loose postal articles, which platform is mounted on an elevator, and said monitoring and control unit may be arranged to control the elevator in such a manner as to keep the pile of loose postal articles a certain setpoint distance away from the vision sensor;

the machine may have a plurality of juxtaposed magazines, in each of which heterogeneous postal articles are stored loose in a pile, a plurality of robotized arms associated with respective ones of the magazines, and a plurality of parallel sideways-sloping flat conveying segments that are fed with postal articles by the respective robotized arms in such a manner that the postal articles are placed such that they are aligned in rows on the sideways-sloping first flat conveying segments so that they can be transferred in rows of postal articles to a second flat conveying segment on which the postal articles are placed in series and spaced apart in pairs at a constant pitch;

the postal articles aligned in rows may be transferred to the second flat conveying segment by a pneumatic pickup of the suction type; and the sorting conveyor may have a flat conveyor for transporting the postal articles in series, flat, and spaced apart in pairs at a constant pitch, and a tipper-platform carrousel that is fed with postal articles by the flat conveyor and that feeds postal articles to a bin carrousel that serves the sorting outlets.

An embodiment of the postal sorting machine of the invention is described below with reference to the drawings.

DESCRIPTION OF EMBODIMENTS

Figure 1:
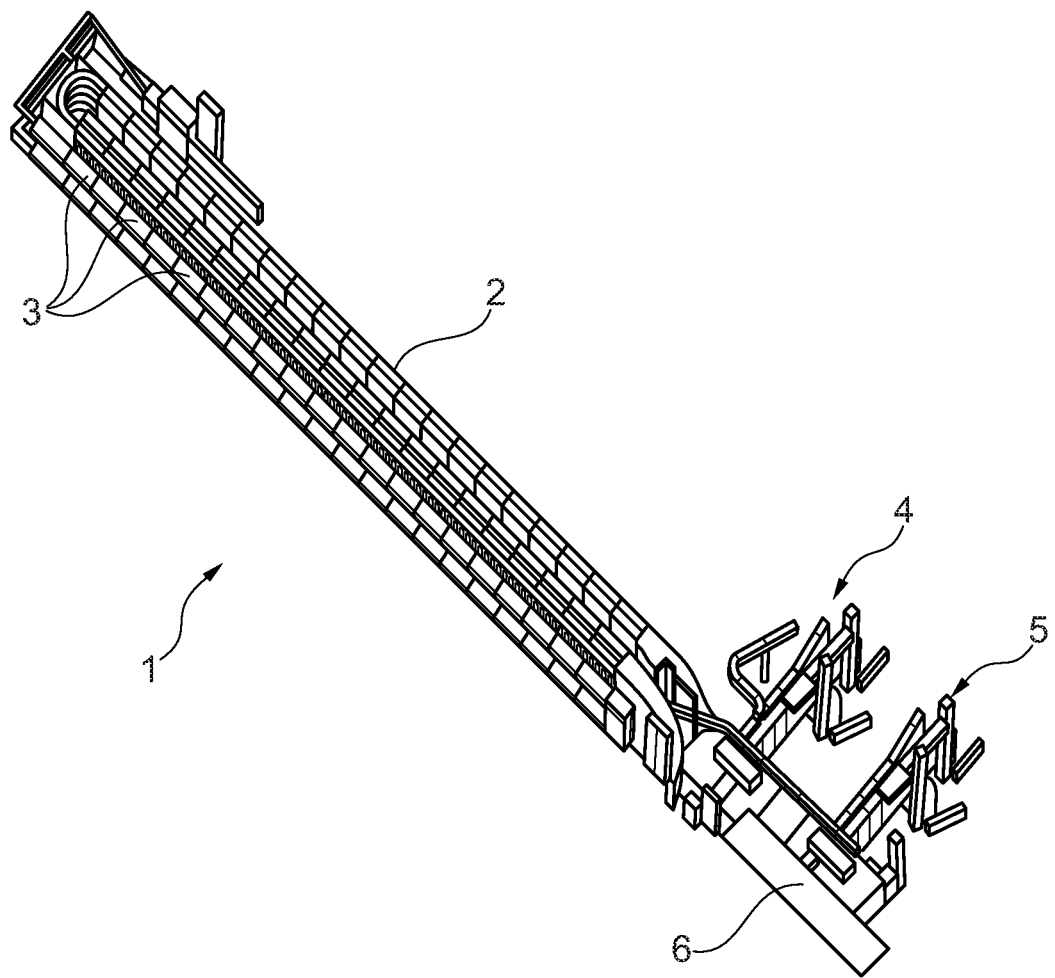
FIG. 1 is a very diagrammatic perspective view of a postal machine 1 of the invention.

FIG. 1 shows a postal sorting machine of the invention seen overall and including a bin sorting carrousel 2.

The bin sorting carrousel 2 has bins (not shown in FIG. 1 but that can be seen in FIG. 4), each of which is adapted for conveying at least one postal article, which, in this example lying within the ambit of the invention, is a flat mailpiece or a small parcel or packet.

The bins of the carrousel 2 circulate around a closed-loop path above sorting receptacles 3 that, in this example, are removable trays in which the sorted articles are placed in superposed manner flat.

FIG. 1 diagrammatically shows two feed branches 4, 5 that, in parallel, feed the bin carrousel 2 with homogeneous flat mailpieces of small and/or large format as is known to the person skilled in the art. These flat mailpieces may, for example, be letters, magazines, or the like.

In FIG. 1, reference 6 designates a specific feed branch of the bin carrousel 2, which branch is specifically for heterogeneous postal articles such as small parcels or packets. The sorting machine 1 makes it possible to mix a stream of small parcels with a stream of mail, thereby making it possible to optimize postal sorting costs.

Each of the feed branches 4 and 5 conventionally includes: a magazine in which the mailpieces are placed in a stack and on edge; an unstacker downstream from the magazine, which unstacker unstacks the mailpieces and puts them into series with constant spacing; a conveyor having nipping belts for transporting the mailpieces in series and on edge at constant spacing past a camera; and then an injector that injects each mailpiece into a bin of the carrousel.

As is known, the camera forms a digital image of the face of each mailpiece that bears a delivery address, and, on the basis of optical character recognition (OCR) of the delivery address in the image, a control unit of the machine determines the receptacle 3 into which the mailpiece should be put by the bin carrousel.

Figure 2:
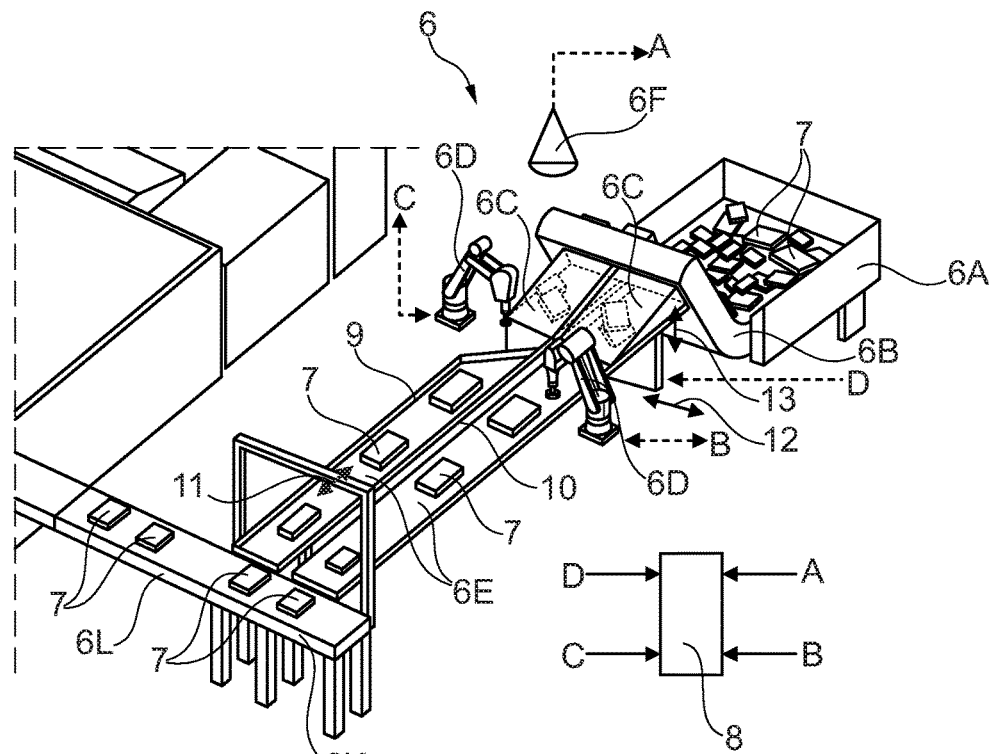
FIG. 2 is a diagrammatic perspective view of an upstream portion of an automatic feed branch for heterogeneous postal articles.

FIG. 2 is a more detailed view of the feed branch 6 that is specifically for heterogeneous postal articles 7. This feed branch 6 is adapted for automatically feeding postal articles 7 to the bin carrousel 2. The exit rate at which the postal articles exit from said feed branch is controlled by the control unit 8 of the sorting machine.

It has an inlet that, in this example, is formed by a sort of hopper 6A into which the postal articles 7 are poured in loose manner. The postal articles 7 placed loosely in the hopper 6A are brought into two magazines 6C, in this example by an upwardly sloping belt conveyor 6B that forms the floor of the hopper 6A. In each magazine 6C, the articles 7 are stored loosely, as shown in FIG. 2.

The feed branch 6 also includes a separator for putting the articles 7 in series, which separator is in the form of a robotized arm, or, as in this example, of two robotized arms 6D, coming to pick up the articles 7 one-by-one from respective ones of the two magazines 6C.

In this example, the feed branch 6 also includes two flat conveyors 6E that are served with articles 7 by respective ones of the robotized arms 6D.

More particularly, each flat conveyor 6E of the belt type has, for example at an upstream end, a flat conveying segment that slopes sideways with a lower side edge 9 and an upper side edge 10 that is higher than the lower side edge 9, which is designed as a jogging edge.

Each robotized arm 6D is, for example, an arm that has six degrees of freedom, that is associated with a vision sensor 6F, and that is provided with a suction pneumatic pickup that is steerable in three-dimensional space. Preferably, the pickup may be of variable geometry, i.e. it may have a central plate provided with a plurality of suction cups and have at least two hinged, fold-up flaps on respective ones of two opposite sides of said central plate, each of which flaps is also provided with a plurality of suction cups. The suction cups of the central plate and of each flap are designed to be controlled selectively so that the grip area of the pickup can correspond either to the area of the central plate, or to the area of the central plate plus the area of one flap, or else to the area of the central plate plus the area of both flaps. This grip area of the variable-geometry pickup makes it possible to improve gripping of parcels or packets having heterogeneous dimensions. The pickup area on each of the parcels or packets is generally rectangular, and by having a grip area on the pickup that is of variable geometry, it is possible to adapt the grip area of the pickup to match the pickup area of the parcel or packet without going beyond that area so as not to touch or damage other articles in the pile of articles during picking up by the robotized arm.

The feed branch 6 also has a second flat conveyor 6L on which the articles 7 are moved in series and flat, while being spaced apart in pairs at a constant pitch. In this example, the flat conveyor 6L is perpendicular to the flat conveyors 6E.

As can be seen in FIG. 2, the parcels or packets 7 that are put by a robotized arm 6D on a track of the corresponding flat conveyor 6E are spaced apart in pairs at a constant pitch. In practice, one or more images of the top of the pile of articles 7 stored loosely in a magazine 6C are taken by the vision sensor 6F and image data A is transmitted to the unit 8, which detects the article 7 to be separated from the pile of articles and identifies a pickup face on said article.

The unit 8 determines the area of said pickup face and controls one of the robotized arms 6D as indicated at B and at C to adapt the geometry of the pickup to match said pickup area, and to use the pickup to take hold of said article 7 via the previously identified pickup face.

The unit 8 synchronizes the movement of the robotized arm with the movement of the flat conveyor 6E so that the robotized arm places the articles 7 successively picked up from the magazine with a constant pitch between their leading edges.

In this example, the two robotized arms 6D operate with the unit 8 and with the vision sensor 6F to put the articles 7 on the two parallel tracks of the conveyor 6E while aligning the leading edges of the articles perpendicular to the longitudinal direction of the conveyor 6E.

In accordance with the invention, each article 7 is put on the sideways-sloping portion of the conveyor 6E in such a manner as to be presented with its long length extending in the longitudinal direction of the conveyor 6E and slightly above the lower edge of the conveyor constituting the jogging edge in such a manner that, once it is released by the pickup, the article comes, by gravity, to jog against the lower edge of the conveyor, thereby making it possible to recover any dispersion in the accuracy of the robotized arm. Said lower edge may be stationary or motor-driven.

A suction-cup pneumatic system that is mounted to move forwards and backwards in the horizontal plane, as indicated by arrow 11 is disposed at the end of the conveyor 6E for taking hold of the articles 7 aligned in rows, the articles being taken hold of in pairs in this example, and for placing them on the flat conveyor 6L while continuing to space them apart at a constant pitch.

It is understood that, if higher throughput rates are desired, a sorting machine of the invention may have more than two parallel tracks or flat conveyors 6E and thus as many robotized arms 6C for feeding the flat conveyor 6L with parcels or packets spaced apart in pairs at a constant pitch.

Figure 5:
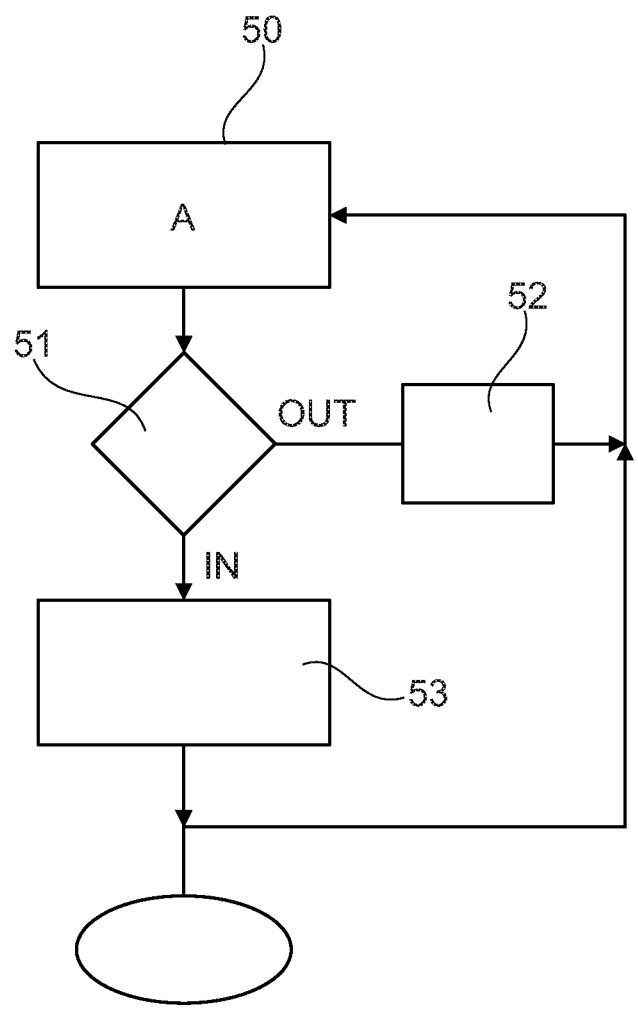
FIG. 5 is a flow chart that shows a certain mode of operation of the control of the robotized arm.

With reference to FIG. 5, in an aspect of the sorting machine of the invention, the unit 8 may be arranged to detect at 51 (FIG. 5) that the image data A produced at 50 (FIG. 5) by the vision sensor 6F is insufficient to identify a completely non-covered pickup surface on the parcel or packet 7 at the top of the pile of articles in a magazine 6C, and to respond, at 52 (FIG. 5), to such detection by causing the magazine to shake by moving it forwards and backwards rapidly, as indicated by arrow 12 in FIG. 2 to change the three-dimensional configuration of the top of the pile of loose articles in the magazine.

One or more new images of the top of the pile of articles placed loosely in the magazine is/are formed by the vision sensor and new image data A is transmitted to the unit 8, thereby possibly releasing the subsequent process of picking up a parcel or packet from the magazine.

If the unit 8 sufficiently detects a pickup face on the article to be separated from the top of the pile, it continues at 53 (FIG. 5) its process of controlling the robotized arm.

In another aspect of the sorting machine of the invention, each magazine 6C has a platform for storing the pile of loose articles 7, which platform is mounted on an elevator such as a hydraulic piston suitable for raising or lowering the platform as indicated by arrow 13.

The unit 8 is arranged to control the elevator in such a manner as to keep the top of the loose pile at a certain setpoint distance from the vision sensor as the parcels are picked up by the robotized arm.

Said setpoint distance corresponds to the distance between the focus plane and the camera of the vision sensor 6F. The depth of field is chosen to be small so that, in the image data A transmitted to the unit 8, the article 7 at the top of the pile of loose articles appears less blurred than the other articles in the pile of loose articles, thereby enabling the unit 8 to identify more precisely a non-covered pickup face on the article at the top of the pile of articles.

Figure 3:
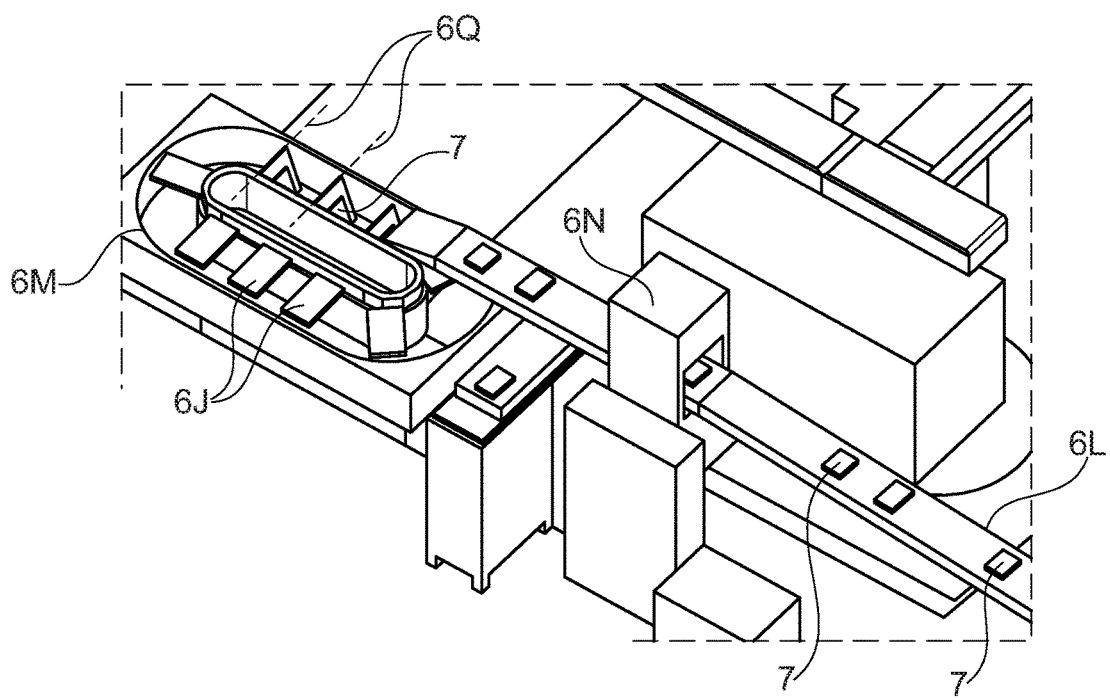
FIG. 3 is a diagrammatic perspective view of a downstream portion of the feed branch of FIG. 2.

FIG. 3 shows the downstream portion of the feed branch 6 with the flat conveyor 6L that transports the postal articles 7 in series, flat, and at constant pitch towards a tipper-platform carrousel 6M that serves to inject the postal articles 7 into the bins of the bin carrousel 2.

As can be seen in FIG. 3, an image-taking system 6N is disposed in the path of the conveyor 6L so as to form two digital images of respective ones of the two opposite sides of each postal article 7.

On the basis of the two digital images, the control unit can assess a delivery address for the postal article in question so as to direct said postal article into a corresponding sorting outlet tray.

The tipper-platform carrousel 6M has tipper platforms 6P, each of which is mounted to tilt about a side pivot axis and which circulate over a closed-loop path above the bins of the bin conveyor 2.

Each of the tipper platforms of the carrousel 6M is loaded with a postal article 7. The postal articles 7 arrive one-by-one on the platforms of the conveyor 6M via a downwardly sloping free end of the flat conveyor 6L, which is vertically above the carrousel 6M.

Figure 4:
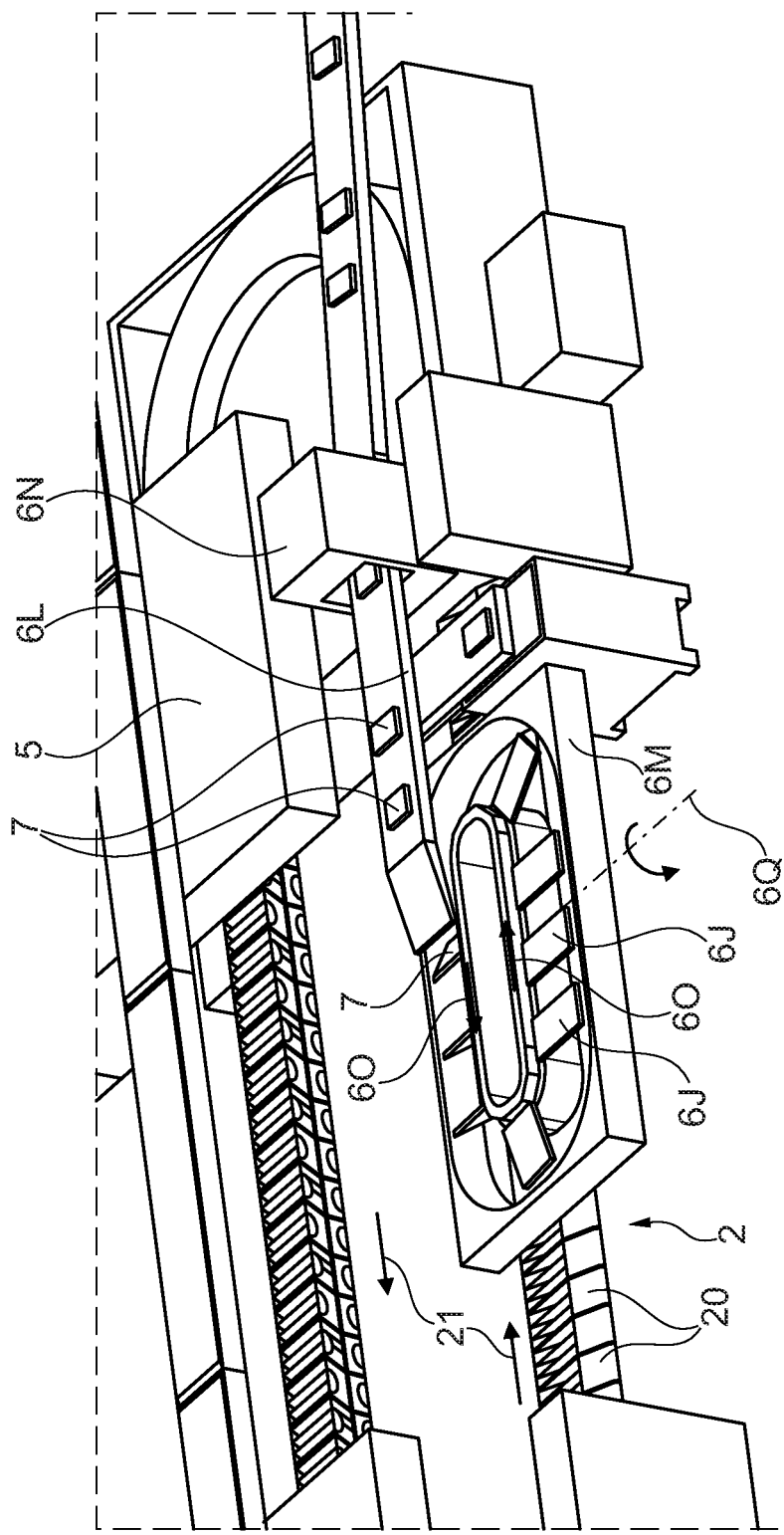
FIG. 4 is a view in more detail, showing the feed branch for heterogeneous articles, the platform conveyor and the bin conveyor.

As shown in FIG. 4, the tilt axis 6Q of each of the platforms of the platform-carrousel extends transversely to the direction of circulation of the platforms, and each of the bins of the bin carrousel has a long dimension (corresponding to the long dimension of the mailpieces) that extends transversely to the direction 21 of circulation of the bins 20 so that each postal article 7 is transferred by sliding from a platform to a bin, in which it is stored substantially on edge on its long side.

It should be noted that the platforms of the carrousel 6M move synchronously with the bins 20 of the carrousel 2. The postal articles 7 are thus injected merely by gravity into the bins 20 of the carrousel 2. The injection point at which the articles 7 are injected into the carrousel 2 is upstream, relative to the direction 21, from the injection point at which the mailpieces coming from the feed branch 5 are injected.

By way of example, the relative throughput rate of the specific branch 6 may be one postal article 7 for every six consecutive bins of the carrousel 2.

At the end of the tilting movement, each platform is brought back up automatically into the horizontal position by a ramp system.

Naturally, the present invention is in no way limited to the above description of one of its embodiments, which can undergo modifications without going beyond the ambit of the invention.

The invention claimed is:

1. A postal sorting machine comprising a sorting conveyor suitable for transporting postal articles in series past sorting outlets and a postal article feed unit having a magazine for storing postal articles to be sorted and a separator that is suitable for injecting the postal articles to be sorted one-by-one from the magazine onto the sorting conveyor while placing them in series at constant pitch, said postal sorting machine being characterized in that the separator has a robotized arm provided with a pneumatic pickup that is steerable in three-dimensional space, a vision sensor suitable for observing a pile of postal articles stored loosely in the magazine to produce image data including a certain postal article to be separated from the pile of loose postal articles, and a monitoring and control unit that, on the basis of said image data produced by the vision sensor, is suitable for identifying a non-covered pickup face of said certain postal article so that said postal article can be gripped by the pickup, said monitoring and control unit also being arranged to control the robotized arm in such a manner as to come and pick up said certain postal article via said postal article pickup face and put said postal article onto the sorting conveyor, in that a flat conveying segment is organized to slope sideways, with a lower side edge and an upper side edge that is higher than the lower side edge, which is designed as a jogging edge, and in that the robotized arm is designed to put each postal article, separated from the pile of loose postal articles, individually onto the sideways-sloping flat conveying segment in such a manner that said article comes, by gravity, to be jogged against the lower edge of the conveyor.

2. The postal sorting machine according to claim 1, characterized in that said monitoring and control unit is also arranged to control the robotized arm in such a manner that said robotized arm pickup comes to pick up said certain postal article from the magazine via said certain postal article pickup face and to inject said certain postal article onto the sorting conveyor, and in that the monitoring and control unit is also arranged to detect that the data produced by the vision sensor is insufficient to identify said certain postal article, and to respond to such detection by causing the magazine to shake by moving said magazine forwards and backwards to change the three-dimensional configuration of the pile of loose postal articles.

3. The postal sorting machine according to claim 1, characterized in that said feed magazine has a platform for storing the pile of loose postal articles, which platform is mounted on an elevator, and in that said monitoring and control unit is arranged to control the elevator in such a manner as to keep the top of the pile of loose postal articles a certain setpoint distance away from the vision sensor.

4. The sorting machine according to claim 1, characterized in that said sorting machine has a plurality of juxtaposed magazines, in each of which postal articles are stored loose, a plurality of robotized arms associated with respective ones of said magazines, and a plurality of parallel flat conveying segments that are fed with parcels by said respective robotized arms in such a manner that the postal articles are placed such that they are aligned in rows on said first flat conveying segments so that they can be transferred in rows of postal articles to a second flat conveying segment on which the postal articles are placed in series and spaced apart in pairs at a constant pitch.

5. The sorting machine according to claim 4, characterized in that the postal articles aligned in rows are transferred to the second flat conveying segment by a pneumatic pickup.

6. The sorting machine according to claim 1, characterized in that the sorting conveyor has a flat conveyor for transporting the postal articles in series, flat, and spaced apart in pairs at a constant pitch, and a tipper-platform carrousel that is fed with postal articles by said flat conveyor and that feeds postal articles to a bin carrousel that serves the sorting outlets.

* * * * *